United States Patent
Kim et al.

(10) Patent No.: US 10,333,377 B2
(45) Date of Patent: Jun. 25, 2019

(54) HYBRID SELF-GENERATION APPARATUS USING VIBRATION SOURCE AND WIND POWER SOURCE, AND WIRELESS SENSOR USING THE SAME

(71) Applicant: ELECTRONICS AND TELECOMMUNICATIONS RESEARCH INSTITUTE, Daejeon (KR)

(72) Inventors: Young Il Kim, Daejeon (KR); Byeong Cheol Choi, Daejeon (KR); Hyo Chan Bang, Daejeon (KR); Geon Min Yeo, Daejeon (KR); Sun Hwa Lim, Daejeon (KR); Dae Geun Park, Daejeon (KR); Soon Yong Song, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/831,653

(22) Filed: Dec. 5, 2017

(65) Prior Publication Data

US 2018/0166962 A1 Jun. 14, 2018

(30) Foreign Application Priority Data

Dec. 12, 2016 (KR) .......................... 10-2016-0168956

(51) Int. Cl.
*F03D 9/00* (2016.01)
*F03D 9/32* (2016.01)
(Continued)

(52) U.S. Cl.
CPC ............. *H02K 35/02* (2013.01); *B61C 17/06* (2013.01); *F01D 15/10* (2013.01); *F03D 9/00* (2013.01);
(Continued)

(58) Field of Classification Search
USPC ...................................... 290/52, 53
See application file for complete search history.

(56) References Cited

U.S. PATENT DOCUMENTS 7,135,786 B1 * 11/2006 Deets ..................... B60K 16/00
290/55
8,629,572 B1 * 1/2014 Phillips ................... F03B 13/16
290/53
(Continued)

FOREIGN PATENT DOCUMENTS

CN 101865410 A 10/2010
CN 102832686 A 12/2012
(Continued)

*Primary Examiner* — Pedro J Cuevas
(74) *Attorney, Agent, or Firm* — LRK Patent Law Firm (57) ABSTRACT

A hybrid self-generation apparatus includes a vibration source based generation part installed in a mechanical apparatus and converting vibration energy generated during operation or movement of the mechanical apparatus into first electric energy; a wind power source based generation part installed in the mechanical apparatus and converting kinetic energy of air generated in periphery of the mechanical apparatus during operation or movement of the mechanical apparatus into second electric energy; and a power storage part storing the first electric energy and the second electric energy. Also, the wind power source based generation part includes at least one air controller, and the wind power source based generation part automatically operates or stops power generation according to a movement speed of the mechanical apparatus in accordance with operation of the at least one air controller.

19 Claims, 6 Drawing Sheets

(51) Int. Cl.
    *F03G 7/08*        (2006.01)
    *H02K 7/18*       (2006.01)
    *F01D 15/10*     (2006.01)
    *H02K 35/02*    (2006.01)
    *B61C 17/06*    (2006.01)

(52) U.S. Cl.
    CPC ............... *F03D 9/32* (2016.05); *F03G 7/08* (2013.01); *H02K 7/18* (2013.01); *Y02E 10/728* (2013.01)

(56) References Cited

U.S. PATENT DOCUMENTS

| | | | |
|---|---|---|---|
| 8,946,919 B2* | 2/2015 | Phillips | F03B 13/16 290/53 |
| 8,946,920 B2* | 2/2015 | Phillips | F03B 13/16 290/53 |
| 8,952,560 B2* | 2/2015 | Phillips | F03B 13/16 290/53 |
| 8,963,358 B2* | 2/2015 | Phillips | F03B 13/16 290/53 |
| 9,476,400 B2* | 10/2016 | Phillips | F03B 13/16 |
| 9,555,753 B2* | 1/2017 | James | B60R 16/03 |
| 9,624,900 B2* | 4/2017 | Phillips | F03B 13/20 |
| 9,644,601 B2* | 5/2017 | Phillips | F03B 13/16 |
| 9,701,325 B2* | 7/2017 | Kim | H02N 2/186 |
| 9,745,960 B2* | 8/2017 | Dietzel | F03D 7/0224 |
| 10,011,910 B2* | 7/2018 | Phillips | H02K 7/1853 |
| 10,047,717 B1* | 8/2018 | Phillips | F03B 13/20 |
| 10,110,010 B2* | 10/2018 | Lucas | H02J 3/381 |
| 10,122,178 B2* | 11/2018 | Sachs | H02J 3/46 |
| 10,128,659 B2* | 11/2018 | Rive | H02J 3/382 |
| 10,169,832 B2* | 1/2019 | Soysal | G06Q 50/06 |
| 2013/0341934 A1* | 12/2013 | Kawanishi | B60L 8/00 290/1 A |
| 2014/0117673 A1* | 5/2014 | Phillips | F03B 13/16 290/53 |
| 2014/0117674 A1* | 5/2014 | Phillips | F03B 13/16 290/53 |
| 2014/0300182 A1* | 10/2014 | James | B60R 16/03 307/10.1 |
| 2014/0313001 A1* | 10/2014 | Phillips | F03B 13/16 335/306 |
| 2014/0339928 A1* | 11/2014 | Phillips | F03B 13/16 310/30 |
| 2015/0145258 A1* | 5/2015 | Phillips | F03B 13/16 290/53 |
| 2015/0240786 A1* | 8/2015 | Dietzel | F03D 7/0224 290/44 |
| 2016/0010619 A1* | 1/2016 | Phillips | F03B 13/16 290/53 |
| 2016/0152252 A1* | 6/2016 | Kim | H02N 2/186 701/31.4 |
| 2016/0252071 A1* | 9/2016 | Phillips | F03B 13/20 290/50 |
| 2016/0336836 A1* | 11/2016 | Bickers | H02K 21/24 |
| 2017/0033381 A1* | 2/2017 | Reilly | H01M 8/0656 |
| 2017/0151964 A1* | 6/2017 | Kim | H02N 2/186 |
| 2017/0198401 A1* | 7/2017 | Phillips | H02K 7/1853 |
| 2017/0320094 A1* | 11/2017 | Merzhaeuser | B06B 1/186 |
| 2017/0342963 A1* | 11/2017 | Dietzel | F03D 7/0224 |
| 2019/0006912 A1* | 1/2019 | Zhu | H02K 7/1838 |

FOREIGN PATENT DOCUMENTS

| | | |
|---|---|---|
| CN | 101666292 B | 2/2013 |
| CN | 203640925 U | 6/2014 |
| CN | 103684047 B | 8/2015 |
| CN | 103511187 | 12/2015 |
| CN | 103352816 B | 1/2016 |
| CN | 205150103 U | 4/2016 |
| KR | 10-1169546 B1 | 7/2012 |
| KR | 10-1249207 B1 | 4/2013 |
| KR | 10-2015-0061097 A | 6/2015 |

\* cited by examiner

HYBRID SELF-GENERATION APPARATUS USING VIBRATION SOURCE AND WIND POWER SOURCE, AND WIRELESS SENSOR USING THE SAME

CROSS-REFERENCE TO RELATED APPLICATIONS

This application claims priority to Korean Patent Application No. 10-2016-0168956, filed Dec. 12, 2016 in the Korean Intellectual Property Office (KIPO), the entire content of which is hereby incorporated by reference.

BACKGROUND

1. Field of the Invention

The present disclosure relates to a self-generation apparatus and a wireless sensor using the same, and more specifically, to a hybrid type self-generation apparatus for generating electric power by utilizing a vibration source and a wind power source, which are generated during operation of a mechanical apparatus, for supplying the electric power to a low-power wireless sensor mounted on the mechanical apparatus such as a train, and a wireless sensor using, the same.

2. Description of Related Art

In order to ensure safe operations of a train, a low-power wireless sensor system that continuously monitors vibration and heat generation of bogies should be applied. However, power may not be supplied to freight trains and existing legacy trains, and thus self-generation technologies for generating and supplying electric power should be used.

The self-power generation technology using vibration sources is being under development or being demonstrated as one of the self-generation technologies utilizing energy sources generated by movement of the train. However, the technology that uses the vibration sources can generate electric power required of driving the wireless sensor system when the speed of the train reaches a certain level, so that a technology capable of generating stable electric power at a train speed lower than that is need.

SUMMARY

Accordingly, embodiments of the present disclosure provide a hybrid self-generation apparatus for generating and supplying electric power required for wireless sensors measuring vibration and heat generation of bogies of a train, in case that the wireless sensors of monitoring states of components in the train for safety operations of the train are installed in the bogies for which power is not supplied.

Accordingly, embodiments of the present disclosure also provide a hybrid self-generation apparatus that generates electric power by utilizing a wind power source at a low speed and generates electric power by utilizing a vibration source at a speed higher than a predetermined speed. That is, there are vibration and wind power as energy sources generated when the train travels. Currently, technologies for generating electric power using vibration sources are being developed. However, in case that only the vibration source is used, since vibration enough to generate power may not exist when the train runs at a low speed, it may be difficult to perform continuous monitoring. Therefore, it is another object of the present disclosure to provide a hybrid self-generation apparatus capable of generating electric power even at low speed by utilizing the wind power source according to the operation of the train.

Accordingly, embodiments of the present disclosure also provide an energy harvester (self-generation) structure for generating electric power for driving a low-power sensor mounted on a bogie of the train for which power is not supplied.

Accordingly, embodiments of the present disclosure also provide a wireless sensor using the above-described hybrid self-generation apparatus.

In order to achieve the objective of the present disclosure, a hybrid self-generation apparatus may comprise a vibration source based generation part installed in a mechanical apparatus and converting vibration energy generated during operation or movement of the mechanical apparatus into first electric energy; a wind power source based generation part installed in the mechanical apparatus and converting kinetic energy of air generated in periphery of the mechanical apparatus during operation or movement of the mechanical apparatus into second electric energy; and a power storage part storing the first electric energy and the second electric energy. Also, the wind power source based generation part may include at least one air controller, and the wind power source based generation part may automatically operate or stop power generation according to a movement speed of the mechanical apparatus according to operation of the at least one air controller.

Both of the vibration source based generation part and the wind power source based generation part may operate in a first time period during which the movement speed of the mechanical apparatus is equal to or greater than a first speed and equal to or less than a second speed, and only the vibration source based generation part may operate in a second time period during which the movement speed of the mechanical apparatus exceeds the second speed.

Only the wind power source based generation part may operate in in a first time period during which the movement speed of the mechanical apparatus is equal to or greater than a first speed and equal to or less than a second speed, and only the vibration source based generation part may operate in a second time period during which the movement speed of the mechanical apparatus exceeds the second speed.

Power generated by the wind power source based generation part or the vibration source based generation part or power stored in the power storage part may be supplied to a wireless sensor installed in the mechanical apparatus.

The at least one air controller may comprise a housing having an inner space, an air inlet at one side of the inner space, and an air outlet at the other side of the inner space; a first blocking wall which is installed to divide the inner space between the one side and the other side and permits air flow between the one side and the other side; a second blocking wall which is installed to divide the internal space between the one side and the first blocking wall and has a center hole permitting air flow between the one side and the other side; a first air sensor plate which is disposed with a first tension spring between the first air sensor plate and the first blocking wall and blocks the center hole at the other side when a tension of the first tension spring is less than a first pressure; and a second air sensor plate which is disposed in a direction of the one side on the first air sensor plate with an interval corresponding to an interval between the first blocking wall and the first air sensor plate.

The at least one air controller may further include an air reflector protruding from an inner wall between the first blocking wall and the second blocking wall of the housing to guide the air flow from the one side to the other side.

The at least one air controller may include a first air controller and a second air controller which face each other with at least one rotor blade of the wind power generator interposed therebetween.

The wind power source based generation part may include a wind power generator having a rotor, at least one rotor blade coupled to the rotor, a stator surrounding the rotor, and a coil installed in the rotor or the stator; the at least one air controller controlling air flow to be supplied to the at least one rotor blade; and a first rectifier rectifying alternating current (AC) output from the wind power generator.

The vibration source based generation part may include a vibration generator having a vibrator vibrating in one direction, a winding coil disposed around the vibrator to form circular or polygonal surfaces orthogonal to or intersecting with the one direction, and a stator supporting the winding coil; and a second rectifier rectifying alternating current (AC) output from the vibration generator.

The power storage part may include a super capacitor for storing a first direct current (DC) output from the first rectifier and a second DC output from the second rectifier.

The power storage part may further include a protection circuit connected in parallel between both ends of the super capacitor between the super capacitor and a load, when the both ends of the super capacitor are connected in parallel to the load.

The power storage part may further include a first super capacitor storing a first direct current (DC) output from the first rectifier; a second super capacitor storing a second DC output from the second rectifier; and a switching circuit for connecting one of the first super capacitor and the second super capacitor to a load.

The power storage part may further include a sensor generating or outputting a control signal for changing an operation mode of the switching circuit in accordance with operation state of the wind power source based generation part.

In order to achieve the objective of the present disclosure, a wireless sensor may comprise the hybrid self-generation apparatus and a sensor device operating based on power generated by the hybrid self-generation apparatus.

The wireless sensor may further comprise a communication device operating based on the power generated by the hybrid self-generation apparatus.

The hybrid self-generation apparatus may generate electric power by using a vibration source and a wind power source generated during movement of a train.

Using the hybrid self-generation apparatus according to embodiments of the present disclosure as described above, a power source of a wireless sensor needed for safe operation of the train may not be supplied from the outside, but self-generated by using a vibration energy source and a wind power energy source which are generated by the operation of the train. Thus, the wireless sensor system for monitoring operation states of the train, which is connected to such the hybrid self-generation apparatus and driven substantially permanently, can be provided.

Also, it is made possible to provide an environment for permanently monitoring the traveling state of the train in real time through a technique of always supplying electric power to the wireless sensor by self-generated power regardless of the traveling speed of the train.

Also, there is an advantage that the hybrid self-generation apparatus capable of being driven substantially permanently irrespective of the traveling environment of the train, such as rain or snow, and the wireless sensor having the hybrid self-generation apparatus can be provided.

Also, it is made possible to provide a safety system capable of monitoring operations of the train by continuously monitoring vibration and heat generation state of the driving parts of the train, and monitoring the occurrence of a problem in real time to generate an alarm.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings.

Figure 1:
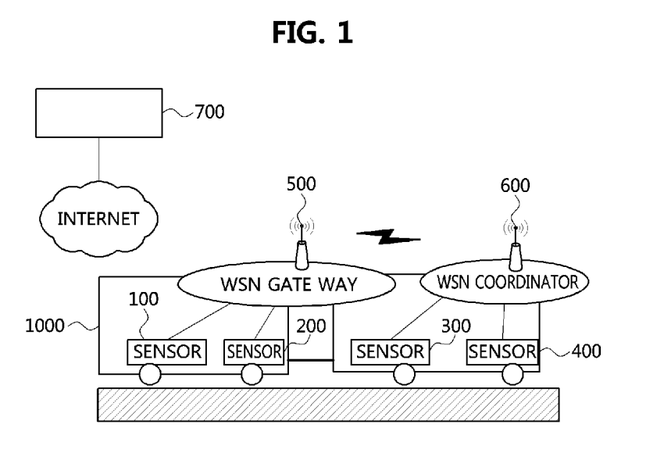
FIG. 1 is a conceptual diagram illustrating a train wireless sensor network system capable of employing a hybrid self-generation apparatus according to an embodiment of the present disclosure.

FIG. 1 is a conceptual diagram illustrating a train wireless sensor network system capable of employing a hybrid self-generation apparatus according to an embodiment of the present disclosure.

Referring to FIG. 1, a hybrid self-generation apparatus according to the present embodiment may be mounted on a train 1000, and more specifically, a sensor 100, 200, 300, or 400 which monitors operation states of the train 1000. The sensors 100, 200, 300, and 400 may form a wireless sensor network (WSN) within the train 1000 as sensor nodes or sensor units.

In order to securely operate a train in the train WSN system based on an energy harvester (self-generation) as shown in FIG. 1, the sensors 100, 200, 300, and 400 for monitoring heat and vibration of bogies of the train in real-time may be installed at the bottom of the train lorries, and each of the sensors may be wirelessly interworked with a WSN coordinator 600 or a WSN gateway 500.

Sensed data received by the WSN coordinator 600 may be transmitted to a sensor monitoring center 700 using a wireless communication technology, through a connection with Internet via the WSN gateway 500 to analyze operation states of the train. The wireless communication technology may include 3GPP LTE, LTE-R (i.e., integrated radio network dedicated for railway), Wi-Fi, and the like.

Since the wireless sensors 100, 200, 300, and 400 of FIG. 1 may have substantially identical configuration, only the wireless sensor 100, which is one of them, will be described below.

Figure 2:
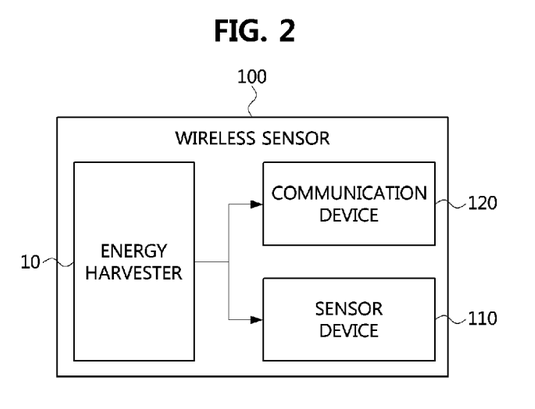
FIG. 2 is a diagram illustrating configuration of a sensor unit that can be employed in the train WSN system of FIG. 1.

FIG. 2 is a diagram illustrating configuration of a sensor unit that can be employed in the train WSN system of FIG. 1.

Referring to FIG. 2, the wireless sensor 100 according to the present embodiment may comprise an energy harvestor 10, a sensor device 110, and a communication device 120. The wireless sensor 100 may be referred to as a wireless sensor, a wireless sensing device, a wireless sensing system, or the like.

The energy harvester 10 may generate electric power by using a wind power and a vibration which are generated according to travelling of the train, and supply the generated electric power to the sensor device 110 and the communication device 120. At this time, the energy harvester 10 may generate electric power using the wind power alone, a combination of the wind power and vibration, or the vibration alone depending on the speed of the train. In particular, the energy harvester 10 may be configured to operate in any one of the above three operation modes in accordance with service sections of the train in consideration that the vibration is generated almost constantly for any service section of the train.

The energy harvester 10 may comprise a first generator for converting mechanical vibration energy into electric energy through a piezoelectric transducer or the like, and a second generator for converting wind power energy into electric energy. The second generator may include a direct current (DC) or alternating current (AC) generator. The first generator and the second generator may be connected to each other so as to store power in a same energy storage device.

The sensor device 110 may be installed in a bogie of the train and may receive electric power from the energy harvester 10 to monitor the bogie. The bogie may receive high physical strength. In other words, when the train is operated, the bogie may not only handle massive weight, but also braking, acceleration and centrifugal forces may act on wheels and bearings of the bogie. For this reason, the sensor device 110 may be used for early detection of wear and material fatigue in the driving equipment of the bogie. The sensor device 110 may sense speed, rotation speed, acceleration, temperature, heat, etc. in the bogie.

This sensor device 110 is required to withstand extreme environmental conditions of the railroad vehicle. The railroad vehicles may include locomotives, towing cars, freight cars, etc., and the extreme environmental conditions may include heat, cold, large temperature changes, humidity, high atmospheric humidity, dust, gravel impact, and the like.

Also, the sensor device 110 may be arranged in combination with at least one of various sensors for control of the train in accordance with an implementation. Various sensors may include sensors that obtain rotational speed for brake control. The sensor device 110 may be connected to a control system of the train or a train control system through the communication device 120 to transmit or receive signals or data, and may output a predetermined output signal in response to an input control signal included in the signal or data.

The communication device 120 may include a transceiver capable of wirelessly transmitting and receiving data through 3GPP LTE, LTE-R (i.e., integrated radio network dedicated for railway), national emergency safety communication network, and the like. The communication device 120 may include at least one communication module according to at least one wireless communication scheme and may transmit a data signal acquired from the sensor device 110 through an external interface or a communication interface to an external device (e.g., the sensor monitoring center 700, etc.).

In the case where the LTE-R module is installed, the communication device 120 may support the 3GPP-UTRA Release 9 compatible standard and may have a uplink (UL) speed of 718 to 728 MHz, a downlink (DL) speed of 773 to 783 MHz, a channel bandwidth of 3, 5, or 10 MHz, modulation schemes of QPSK, 16QAM, and 64QAM for downlink and QPSK and 16QAM for uplink, and a throughput 75 Mbps for the bandwidth of 10 MHz (DL) and 25 Mbps for the bandwidth of 10 Mhz (UL). Also, the communication device 120 may support RF paths of 2×Rx/1×Tx, a Rx sensitivity of −93.5 dBm, a maximum transmission power of 25 dBm, single-user (SU) or multi-user (MU) DL MIMO, and MU UL MIMO, an end to end delay of 350 ms or less, and an authentication UICC.

Figure 3:
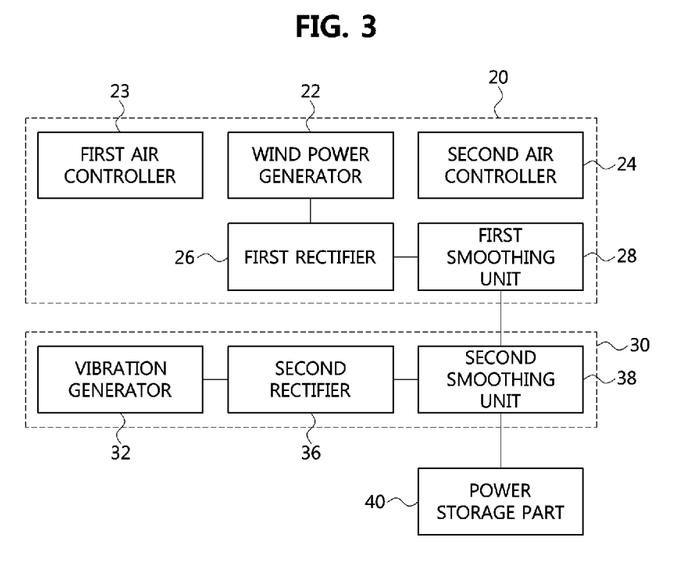
FIG. 3 is a diagram illustrating a hybrid self-generator according to an embodiment of the present disclosure.

FIG. 3 is a diagram illustrating a hybrid self-generator according to an embodiment of the present disclosure.

Referring to FIG. 3, the hybrid self-generation apparatus according to the present embodiment may comprise a wind power source based generation part 20, a vibration source based generation part 30, and a power storage part 40. The wind power source based generation part 20 may correspond to the first generator, and the vibration source based generation part 30 may correspond to the second generator. The wind power source based generation part 20 may be referred to as a wind power source based power generator, and the vibration source based power generation part 30 may be referred to as a vibration source based power generator.

The wind power source based generation part 20 may include a wind power generator 22, a first air controller 23, a second air controller 24, a first rectifier 26, and a first smoothing unit 28. The first air controller 23 and the second air controller 24 may be disposed on the left and right sides of the wind power generator 22, respectively. Of course, depending on the implementation, one of the first air controller 23 and the second air controller 24 may be omitted.

The wind power generator 22 may have a structure including a rotor combined with at least one rotor blade and a stator rotatably coupled to the rotor. The wind power generator 22 may have a structure in which electric energy is induced at a coil disposed on the stator by the rotor that rotates according to the rotation of the at least one blades which is caused by the wind energy supplied from the first air controller 23 and/or the second air controller 24.

The first rectifier 26 may rectify AC power generated by the wind power generator 22 to generate DC power. The first rectifier 26 may include, but is not limited to, a bridge diode. The first smoothing unit 28 may convert a pulsating current output from the first rectifier 26 into a relatively flat DC. The power output from the first smoothing unit 28 may be stored in the power storage part 40.

The vibration source based generation part 30 may include a vibration generator 32, a second rectifier 36, and a second smoothing unit 38. The second smoothing unit 38 may be omitted depending on a structure, a rectifying method, or the like of the second rectifier 36.

The vibration generator 32 may convert the vibration energy of the train into electric energy. The vibration generator 32 may be implemented as a piezoelectric type, an electrostatic type, an electromagnetic type, or the like. The electromagnetic type is best for self-generation by bending, the piezoelectric type is best for self-generation by pressure power, and the piezoelectric type has best power density. Therefore, the vibration generator 32 of the present embodiment may be implemented in a combination of the piezoelectric type and another type other than the piezoelectric type in consideration of high-efficiency self-generation.

The second rectifier 36 may rectify AC power generated by the vibration generator 32 to generate DC power. The second rectifier 36 may include, but is not limited to, a bridge diode. The second smoothing unit 38 may convert a pulsating current output from the second rectifier 36 into a relatively flat DC. The power output from the second smoothing unit 38 may be stored in the power storage part 40.

The power storage part 40 may store the power generated by the wind power source based generation part 20 and may store the power generated by the vibration source based generation part 30. The power storage part 40 may include a super capacitor, a lithium battery, a sodium sulfur battery, a redox flow cell, or the like. Also, the power storage part 40 may supply the stored power to the sensor system.

In the present embodiment, the power storage part 40 may be arranged as a separate component from the wind power source based generation part 20 and the vibration source based generation part 30, but embodiments of the present disclosure are not limited to such a configuration, the power storage part 40 may be included in the vibration source based generation part 30, the wind power source power generation part 20, or included in both of them in a shared form.

In the present embodiment, the generated power of the wind power source based generation part 20 and the generated power of the vibration source based generation part 30 may be connected in parallel to each other to supply power to the wireless sensor in a mutually complementary manner.

Since the traveling direction of the train is determined according to the traveling direction of the locomotive, the first air controller 23 and the second air controller 24 may be respectively disposed on the left and right sides of the wind power source based generation part 20, and the wind power generator 22 may generate electric power based on the wind power drawn from the air controllers. The first rectifier 26 and the first smoothing unit 28 may convert AC power generated by the wind power generator 22 into high-quality DC power and store the DC power in the power storage part 40. Also, the vibration generator 32 may operate alone or with the wind power generator 22 in accordance with the speed of the train to convert the vibration energy from the train to generate electric power. The second rectifier 36 and the second smoothing unit 38 may convert AC power generated by the vibration generator 32 into high-quality DC power and store the DC power in the power storage part 40.

Figure 4:
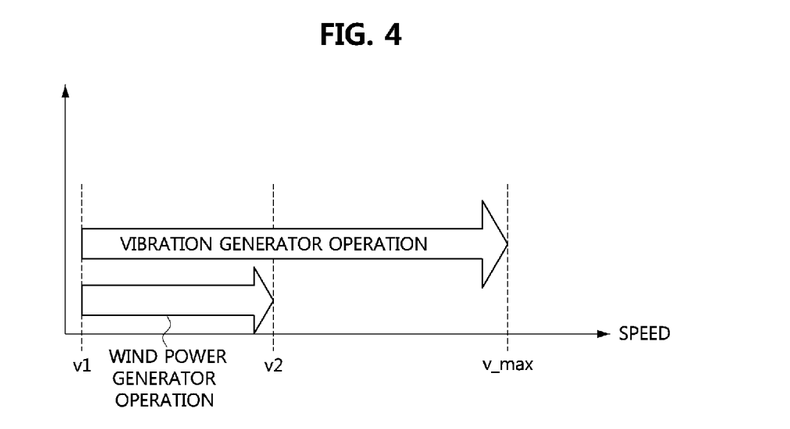
FIG. 4 is an operational state diagram of the hybrid self-generation apparatus of FIG. 3.

FIG. 4 is an operational state diagram of the hybrid self-generation apparatus of FIG. 3.

As described above, the hybrid self-generation apparatus according to the present embodiment may include the wind power generator and the vibration generator. The operation states of the wind power generator and the vibration generator in the hybrid self-generation apparatus may be as shown in FIG. 4.

Referring to FIG. 4, when the train starts to accelerate and reaches a first speed v1, the wind power generator and the vibration power generator may start to operate and generate electric power, respectively.

Since it is difficult for the vibration generator alone to generate a sufficient amount of electric power to drive the wireless sensor in a time period between the first speed v1 and a second speed v2 until the train reaches the second speed v2, the wind power generator may also be activated. Since the wind power generator is able to generate high power according to the acceleration of the train, the output powers of the two generators may be combined to supply power to the wireless sensor.

Also, in a time period between the second speed v2 and a maximum speed V_max, the operation of the wind power generator may be stopped and only the vibration generator may be driven to generate electric power. At this time, an air inlet of the air controller for supplying air flow to the wind power generator may be covered with a separate lid that is openable and closable, thereby preventing damage to the air controller due to impact of an object introduced from the outside and reducing air resistance to the train.

Figure 5:
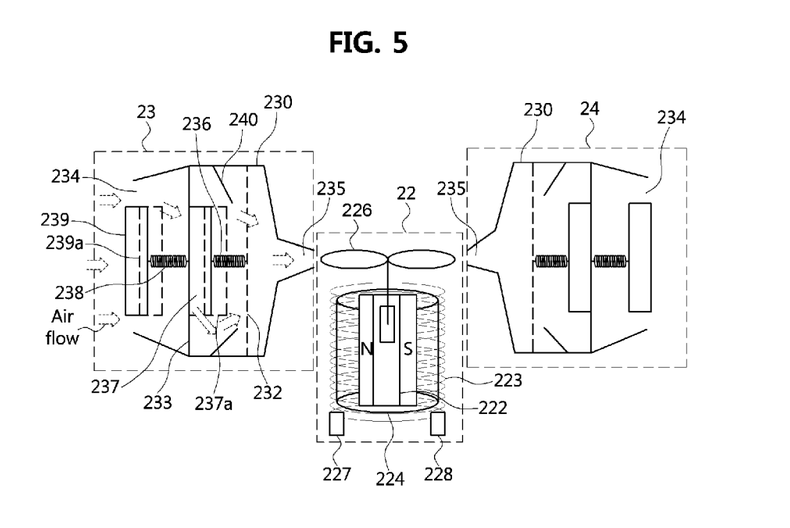
FIG. 5 is a detailed structural diagram illustrating a partial configuration of the wind power source based generation part of the hybrid self-generation apparatus of FIG. 3.
Figure 6:
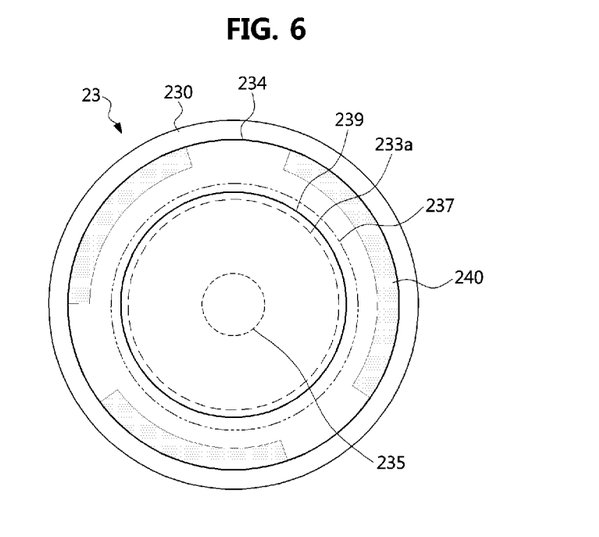
FIG. 6 is a front view of the air controller of the wind power source based generation part of FIG. 5 viewed from the side of an air inlet.
Figure 7:
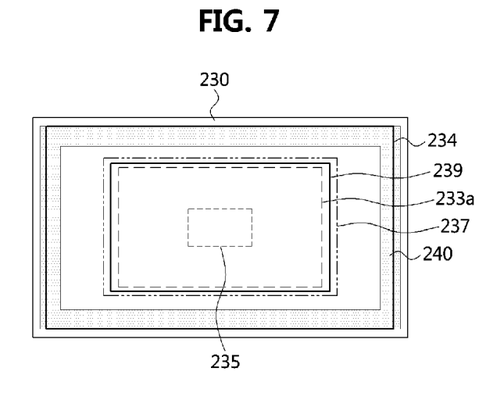
FIG. 7 is an exemplary view illustrating a modified example of the air controller of FIG. 6.

FIG. 5 is a detailed structural diagram illustrating a partial configuration of the wind power source based generation part of the hybrid self-generation apparatus of FIG. 3, FIG. 6 is a front view of the air controller of the wind power source based generation part of FIG. 5 viewed from the side of an air inlet, and FIG. 7 is an exemplary view illustrating a modified example of the air controller of FIG. 6.

Referring to FIG. 5, the wind power source based generation part according to the present embodiment may comprise the wind power generator 22, the first air controller 23, the second air controller 24, the first rectifier 26, and the first smoothing unit 28. In the present embodiment, the wind power generator 22, the first air controller 23, and the second air controller 24 will be described first, and then the first rectifier 26 and the first smoothing unit 28 will be described with reference to FIG. 8.

The wind power generator 22 may include a rotor 222 made of a permanent magnet, a stator 224 disposed around the rotor 222 and generating an induced electromotive force through a coil 223, and at least one rotor blade 226 that rotates by receiving air from each air outlet of the first and second air controllers 23 and 24. The wind power generator 22 may convert kinetic energy of the at least one rotor blade 226 into electric energy. The AC generated in the wind power generator 22 may be output by terminals 227 and 228 connected to the coil 223.

The AC generated in the wind power generator 22 may be converted into a high-quality DC by the first rectifier 26 and the first smoothing unit 28, and be stored in the power storage part.

The first air controller 23 may be disposed at one side (e.g., the left side) of the at least one rotor blade 226 of the wind power generator 22 so as to supply wind to the at least one rotor blade 226 during the operation of the train. Similarly, the second air controller 24 may be disposed on the other side (e.g., the right side) of the at least one rotor blade 226 of the wind power generator 22 so as to supply wind to the at least one rotor blade 226 during the operation of the train. The first air controller 23 and/or the second air controller 24 may function to control air flows required for power generation by utilizing the wind power in the wind power generator 22 and the operation time of the wind power generator 22. Since the first air controller 23 and the second air controller 24 may have substantially the same structure and function, the first air controller 23 will be mainly described below.

The first air controller 23 may include a housing 230, a first blocking wall 232, a second blocking wall 233, an air inlet 234, an air outlet 235, a first tension spring 236, a first air sensor plate 237, a second tension spring 238, a second air sensor plate 239, and an air reflector 240.

Referring to FIGS. 6 and 7 together with FIG. 5, when viewed from the side of the air inlet, the housing 230 may be constituted by a hollow member whose cross section has an elliptical or circular shape (see FIG. 6) or a square or plate shape (see FIG. 7). Of course, at least one surface of the hollow member may be formed as an outer wall or an outer surface of the train or the bogie. The air inlet 234 having a first cross sectional area may be formed at one side of the hollow member of the housing 230, and the air outlet 235 having a second cross sectional area that is significantly smaller than the first cross sectional area may be formed at the other side of the hollow member of the housing 230. The air outlet 235 may be disposed to face the at least one rotor blade 226 of the wind power generator 22.

The first blocking wall 232 may be provided on the hollow member of the housing 230, i.e., on the side of the air outlet 235 in the inner space, so as to divide the inner space. Also, at least a part of the first blocking wall 232 may have a structure capable of air flow. For example, the first blocking wall 232 may have a plate shape having a plurality of through holes in the thickness direction.

The second blocking wall 233 may be provided on the side of the air inlet 234 in the inner space of the housing 230, and may have a square ring shape, a polygonal ring shape or a circular ring shape as a plate structure having a central hole which is opened and closed by the first air sensor plate 237 or the second air sensor plate 239.

The first air sensor plate 237 may move according to the pressure of the air introduced through the air inlet 234. The first air sensor plate 237 may be mounted on one side of the first blocking wall 232 with the first tension spring 236 therebetween. Here, the first blocking wall 232 may block the movement of the first air sensor plate 237.

The second air sensor plate 239 may move according to the pressure of the air input through the air inlet 234. The second air sensor plate 239 may be mounted on the first air sensor plate 237 with the second tension spring 238 therebetween. Here, the second blocking wall 233 may block the movement of the second air sensor plate 239.

The size of a circular or rectangular main surface of the first air sensor plate 237 may be the same as or different from the size of the corresponding main surface of the second air sensor plate 239. However, it is preferable that the size of each of the main surfaces of the first and second air sensor plates 237 and 239 is larger than the size of the center hole 233a of the second blocking wall 233.

The air reflector 240 may focus the air flow introduced into the air inlet 234. The air reflector 240 may be arranged to protrude from the inner wall of the housing 230 into the inner space in an inclined form along the direction of the air flow.

When the train travels from the right side to the left side, the air introduced from the left side may push the second air sensor plate 239 and the first air sensor plate 237 to the right. As shown in FIG. 5, the first air sensor plate 237 and the second air sensor plate 239 pushed to the right are illustrated as the first air sensor plate 237a and the second air plate 239a which are indicated by dotted lines. The first tension spring 236 capable of moving at a low air pressure may be contracted and the first air sensor plate 237 may be moved to the right.

The air introduced through the air inlet 234 may flow around the first air sensor plate 237 through the center hole of the second blocking wall 233, may flow through the through holes of the first blocking wall 232, and may be discharged to the air outlet 235 to rotate the at least one rotor blade 226 of the wind power generator 22, thereby generating electric power.

In the present embodiment, the first air sensor plate 237 is shown as a single block for the sake of convenience, but embodiments of the present disclosure are not limited to such a configuration. The first air sensor plate 237 may be formed in a lattice shape and may move to the first blocking wall 232 blocking the movement of the first air sensor plate 237 while passing the air flow.

Also, when the speed of the train increases, the second tension spring 238 may contract and the second air sensor plate 239*a* may move further to the right. Then, when reaching a critical velocity (e.g., v2 in FIG. 4), the second air sensor plate 239*a* may move to the second blocking wall 233 and block the center hole of the second blocking wall 233 so that the outside air is no longer transferred to the at least one rotor blade 226 of the wind power generator 22, thereby stopping the power generation of the wind power source based generation part.

The first tension spring 236, located between the first blocking wall 232 and the first air sensor plate 237 in the air controller 23, according to the present embodiment, may move away from the center hole 233*a* toward the first blocking wall 232 by moving from the left to the right direction or to the direction opposite to the traveling direction of the train by the force of the air flowing into the air inlet 234 in the time period during which the speed of the train is faster than the first speed (e.g., v1 of FIG. 4) and is somewhat slower than the second speed (e.g., v2 of FIG. 4). At this time, the first tension spring 236 may be contracted to a first length, and the air flowing into the air inlet 234 may be discharged to the air outlet 235 through the center hole 233*a*.

Also, in the time period during which the speed of the train starts to approach the second speed (e.g., v2 of FIG. 4) and becomes equal to or higher than the second speed through the second speed, the first tension spring 236 may be compressed to the maximum when approaching the second speed, and then be relaxed to a second length greater than the first length when the second air sensor plate 239 closes the center hole 233*a*. Here, the second length may be a length obtained by subtracting the first length from a third length when the first tension spring 236 is blocking the center hole 233*a*.

As described above, in the present embodiment, relations among the first air sensor plate 237, the second air sensor plate 239, the first tension spring 236, and the second tension spring 238 may be defined according to the shape and structure of the air controller 23 so as to be automatically operated in the time period between the first speed and the second speed according to the speed of the train, and to be automatically stopped above the second speed.

Meanwhile, when the train travels from the right side to the left side, air may not be introduced into the first air controller 23, and the first air sensor plate 237 may be brought into close contact with the second blocking wall 233 due to elasticity of the first tension spring 236. According to such the structure or operation state, it is possible to prevent foreign objects such as dust from the outside from flowing into the air controller or the wind power generation part, thereby protecting the generator.

When the train travels from the left side to the right side, the second air controller 24 may operate in accordance with the operation principle substantially the same as that of the first air controller 23, and provide air to the at least one rotor blade 226 of the wind power generator 22 so that the wind power generator 22 can generate electric power based on the wind power source.

Figure 8:
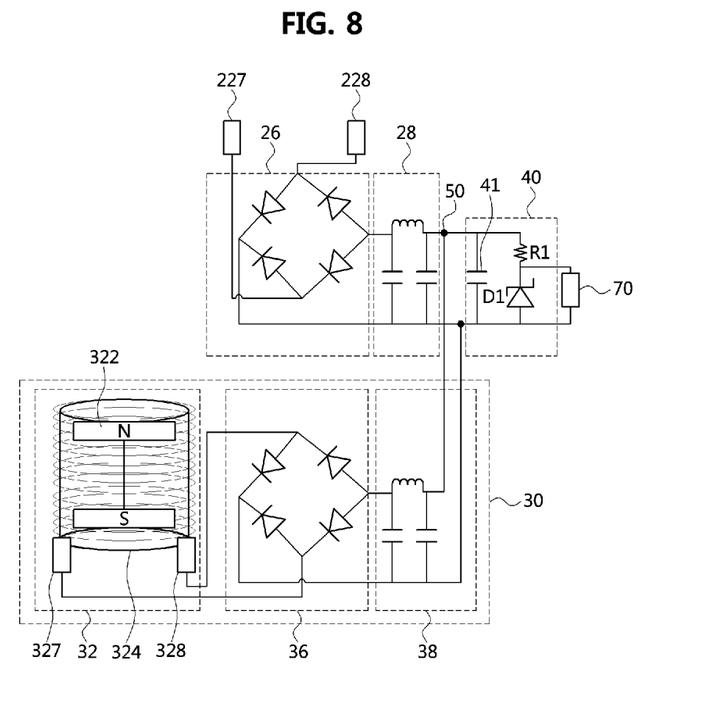
FIG. 8 is a detailed structural diagram of another portion of the wind power source based generation part and the vibration source based generation part of the hybrid self-generation apparatus of FIG. 3.

FIG. 8 is a detailed structural diagram of another portion of the wind power source based generation part and the vibration source based generation part of the hybrid self-generation apparatus of FIG. 3.

Referring to FIG. 8, in the wind power source based generation part according to the present embodiment, the AC power generated in the wind power generator may be transferred to the first rectifier 26 through the two terminals 227 and 228. The first rectifier 26 may have a structure in which four power diodes are arranged in a form of a bridge rectifying diode or a diode bridge.

The pulsating current output from the first rectifier 26 may be transferred to the first smoothing unit 28 so that the pulsating current is converted into a relatively flat DC current. The first smoothing unit 28 may include two capacitors connected in parallel to two output ends of the first rectifier 26 and an inductor connected between high-potential side terminals of the two capacitors.

The power storage part 40 may be connected to the output ends of the first smoothing unit 28. The power storage part 40 may store the power output from the first smoothing unit 28 in a super capacitor 41 in a DC form.

The power stored in the super capacitor 41 may be supplied to a load 70. In case that excessive power is generated from the wind power source based generation part and the vibration source based generation part, a protection circuit may be provided between the super capacitor 41 and the load 70 in order to prevent the load 70 from being damaged and to maintain the life of the power generator. The protection circuit may include an over-charge protection circuit, an over-discharge protection circuit, an over-current protection circuit, a short-circuit protection circuit, or a combination thereof.

In the present embodiment, the protection circuit may include a resistor R1 and a Zener diode D1 that are connected in series with each other. The protection circuit may be connected to both ends of the super capacitor 41 and both ends of the load 70 in parallel. Here, the load 70 may be connected in parallel to the Zener diode D1.

Also, the vibration source based generation part 30 according to the present embodiment may include the vibration generator 32, the second rectifier 36, and the second smoothing unit 38. As shown in FIG. 8, the vibration source based generation part 30 may convert vibration energy of the train into electric energy.

The vibration generator 32 may include a vibrator 322 and a stator 324. The vibrator 322 may be constituted by a permanent magnet which causes up-and-down displacement in accordance with the vibration of the train. The stator 324 may be wound with a coil and may induce electric power in accordance with the displacement of the vibrator 322. The AC generated in the vibration generator 32 may be transmitted to the second rectifier 36 through the terminals 327 and 328 connected to the coil of the stator 324.

The second rectifier 36 may convert the input power including the AC to output a pulsating current. The second rectifier 36 may have a structure in which four power diodes are arranged in a form of a bridge rectifying diode or a diode bridge.

The second smoothing unit 38 may convert the DC in a pulsating wave form output from the second rectifier 36 into a smoothed DC form. The second smoothing unit 38 may be composed of two capacitors and one inductor similar to the first smoothing unit 28.

The DC power generated by the vibration source based power generation part 30 may be added to the DC power of the wind power source based power generation part through power supply terminals 50 and stored in the super capacitor 41, or may be supplied as the driving power to the load 70. The load 70 may include the sensor device (see 110 in FIG. 2) and a communication device (see 120 in FIG. 2) of the wireless sensor.

Figure 9:
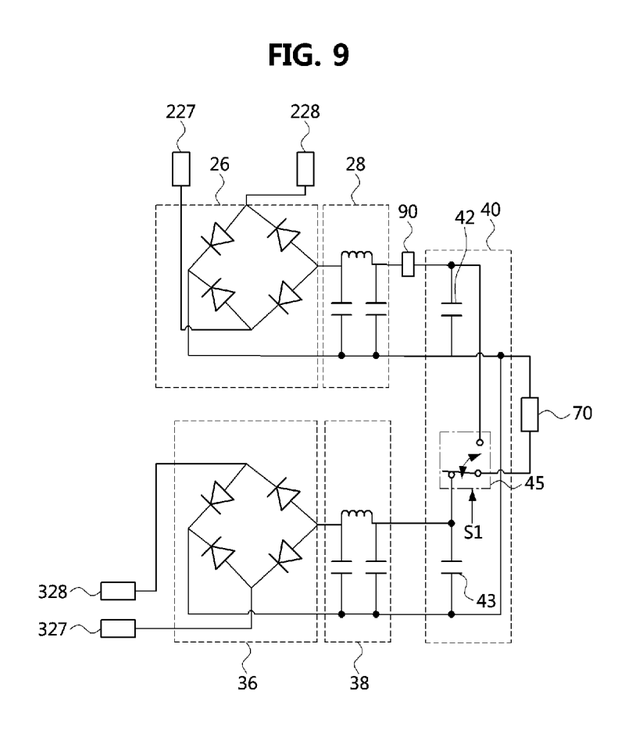
FIG. 9 is a structural diagram for explaining a coupling structure between the wind power source based generation part and the vibration source based generation part that can be employed in the hybrid self-generation apparatus according to another embodiment of the present disclosure.

FIG. 9 is a structural diagram for explaining a coupling structure between the wind power source based generation part and the vibration source based generation part that can be employed in the hybrid self-generation apparatus according to another embodiment of the present disclosure.

Referring to FIG. 9, the hybrid self-generation apparatus according to the present embodiment may include a first super capacitor 42 for storing power generated in the wind power source based generation part, and a second super capacitor 43 for storing power generated in the vibration source based generation part.

In case that the power generated by the wind power source based generation part and the power generated by the vibration source based generation part are respectively stored in separate energy storage devices, management of a plurality of energy storage devices is required. In the present embodiment, through a switching device or a switching circuit 45, the load 70 may be connected to the first super capacitor 42 while the power is generated in the wind power source based generation part, and the load 70 may be connected to the second super capacitor 43 while the power is not generated in the wind power source based generation part.

The switching circuit 45 may selectively connect the load 70 to the first super capacitor 42 or to the second super capacitor 43 according to the operation mode. In order to automatically operate the switching circuit 45, a sensor 90 may be provided in the wind power source based generation part.

The sensor 90 may detect a current or voltage generated at a predetermined level or higher in the wind power source based generation part, and may generate or output a control signal S1 or an event signal corresponding thereto. In the present embodiment, the sensor 90 may be provided in or on a high-potential side wiring of the first smoothing unit 28 and the first super capacitor 42. However, various embodiments are not limited there to, and the sensor 90 may be installed at any position where a current or voltage generated in the wind power source based generation part can be sensed.

Meanwhile, in the above-described embodiment, the hybrid self-generation apparatus has been described with respect to the speed of the train, but embodiments of the present disclosure are not limited to such a configuration. In another embodiment, the vibration source based generation part may be configured to operate only in predetermined time period according to the travel section of the train. Here, the predetermined time period may be configured to be a time period during which the speed of the train is equal to or greater than a first threshold speed (see v2 in FIG. 4) and less than a second threshold speed (see V_max in FIG. 4) based on data measured during train running.

For example, data on vertical vibration measured at the time of running of a high-speed train may be analyzed using a 300 Hz low-pass filter, and the results of the analysis may be used to confirm a vibration tendency during traveling. As a result of the analysis on the measurement data, it may be identified that common areas where the vibration acceleration is high in the high-speed train are a section between Gwangmyeong and CheonanAsan, and a section between Kimcheon and Gumi. Thus, in the modified example of the present embodiment, the vibration source based generation part may be driven in a section where the speed of the train is relatively high, and the wind power source based generation part may be driven in a section where the speed of the train is relatively low.

According to the above-described embodiments, the power required for the low-power wireless sensors for monitoring the operation states of the train can be supplied by the self-power generation using the vibration source and the wind power source generated by the running of the train. Also, it is possible to provide the hybrid self-generation apparatus that generates electric power using the wind power source at a low speed and generates electric power using the vibration source at a high speed. Especially, a method of using the electric powers generated using the wind power source and the vibration source in parallel, or a method of selectively controlling the hybrid self-generator to use the wind power source or the vibration source based on the speed of the train can be used dynamically according to the operation state of the train.

Also, according to the above-described embodiments, the self-generation wireless sensor having the hybrid self-generation apparatus can operate on its own by the vibration of the train without any separate power source to measure the statuses of the components of the train such as axle bearings and wheels, and to wirelessly transmit the measured data to the engine room, a central control room, and so on. Here, the wireless sensor can self-generate the electric power required for the measurement of the statuses of the train, wireless transmission of the measured data, and the like only by the vibration and wind power of the train.

Also, the self-generation wireless sensor can operate at the lowest power by minimizing communication problems such as propagation delay, connection instability, and signal attenuation occurring in a railway environment traveling at high speed. Such a self-generation wireless sensor can have a relatively large self-generation capacity by using a vibration source and a wind power source in combination, and employ a wireless transmission module that uses a smaller amount of electric power than a conventional ultra-low power commercial product even in a short transmission period so that power efficiency can be maximized.

Also, since the self-generation wireless sensor having the hybrid self-power generation apparatus of the present embodiment performs self-generation due to the vibration of the train, it is possible to monitor the abnormality of various railway trains such as freight trains that do not have power facilities therein, high-speed trains, and electric trains in real time. Therefore, the management of the key components of the freight trains such as driving equipment, etc. can be performed in real time even without visual inspection or overhaul through the self-generation wireless sensor during the operation of the freight trains. Accordingly, it is made possible to prevent freight train accidents due to derailment and so on, thereby contributing to safer operation. Also, it is made possible to respond to newly established onboard monitoring safety standards (TSI directive 96/48 EC, etc.) for enhancing the safety of high-speed trains traveling at speeds of 250 km/h or more in Europe.

Meanwhile, the hybrid self-generation apparatus according to the present embodiment or the wireless sensor having the self-generation apparatus can be applied to real-time monitoring for a facility or a mechanical apparatus such as a pump or a compressor that causes vibration, and various industrial facilities such as used plant, power plant, industrial production equipment, and the like.

While the embodiments of the present disclosure and their advantages have been described in detail, it should be understood that various changes, substitutions and alterations may be made herein without departing from the scope of the present disclosure.

What is claimed is:

1. A hybrid self-generation apparatus comprising:
a vibration source based generation part installed in a mechanical apparatus and converting vibration energy generated during operation or movement of the mechanical apparatus into first electric energy;
a wind power source based generation part installed in the mechanical apparatus and converting kinetic energy of air generated in periphery of the mechanical apparatus during operation or movement of the mechanical apparatus into second electric energy; and
a power storage part storing the first electric energy and the second electric energy,
wherein the wind power source based generation part includes at least one air controller, and the wind power source based generation part automatically operates or stops power generation according to a movement speed of the mechanical apparatus according to operation of the at least one air controller,
wherein the wind power source based generation part operates in a first time period during which the movement speed of the mechanical apparatus is equal to or greater than a first speed and equal to or less than a second speed,
wherein the vibration source based generation part operates in a second time period during which the movement speed of the mechanical apparatus exceeds the second speed, and
wherein an air inlet of the at least one air controller is opened in the first time period, and closed in the second period.

2. The hybrid self-generation apparatus according to claim 1, wherein the vibration source based generation part operates in the first time period and the second time period.

3. The hybrid self-generation apparatus according to claim 1, wherein power generated by the wind power source based generation part or the vibration source based generation part or power stored in the power storage part is supplied to a wireless sensor installed in the mechanical apparatus.

4. The hybrid self-generation apparatus according to claim 1, wherein the at least one air controller comprises:
a housing having an inner space, an air inlet at one side of the inner space, and an air outlet at the other side of the inner space;
a first blocking wall which is installed to divide the inner space between the one side and the other side and permits air flow between the one side and the other side;
a second blocking wall which is installed to divide the internal space between the one side and the first blocking wall and has a center hole permitting air flow between the one side and the other side;
a first air sensor plate which is disposed with a first tension spring between the first air sensor plate and the first blocking wall and blocks the center hole at the other side when a tension of the first tension spring is less than a first pressure; and
a second air sensor plate which is disposed in a direction of the one side on the first air sensor plate with an interval corresponding to an interval between the first blocking wall and the first air sensor plate.

5. The hybrid self-generation apparatus according to claim 4, wherein the at least one air controller further includes an air reflector protruding from an inner wall between the first blocking wall and the second blocking wall of the housing to guide the air flow from the one side to the other side.

6. The hybrid self-generation apparatus according to claim 4, wherein the at least one air controller includes a first air controller and a second air controller which face each other with at least one rotor blade of the wind power generator interposed therebetween.

7. The hybrid self-generation apparatus according to claim 1, wherein the wind power source based generation part includes:
a wind power generator having a rotor, at least one rotor blade coupled to the rotor, a stator surrounding the rotor, and a coil installed in the rotor or the stator;
the at least one air controller controlling air flow to be supplied to the at least one rotor blade; and
a first rectifier rectifying alternating current (AC) output from the wind power generator.

8. The hybrid self-generation apparatus according to claim 7, wherein the vibration source based generation part includes:
a vibration generator having a vibrator vibrating in one direction, a winding coil disposed around the vibrator to form circular or polygonal surfaces orthogonal to or intersecting with the one direction, and a stator supporting the winding coil; and
a second rectifier rectifying alternating current (AC) output from the vibration generator.

9. The hybrid self-generation apparatus according to claim 8, wherein the power storage part includes a super capacitor for storing a first direct current (DC) output from the first rectifier and a second DC output from the second rectifier.

10. The hybrid self-generation apparatus according to claim 9, wherein the power storage part further includes a protection circuit connected in parallel between both ends of the super capacitor between the super capacitor and a load, when the both ends of the super capacitor are connected in parallel to the load.

11. The hybrid self-generation apparatus according to claim 8, wherein the power storage part further includes:
a first super capacitor storing a first direct current (DC) output from the first rectifier;
a second super capacitor storing a second DC output from the second rectifier; and
a switching circuit for connecting one of the first super capacitor and the second super capacitor to a load.

12. The hybrid self-generation apparatus according to claim 11, wherein the power storage part further includes a sensor generating or outputting a control signal for changing an operation mode of the switching circuit in accordance with operation state of the wind power source based generation part.

13. A wireless sensor comprising:
a hybrid self-generation apparatus according to claim 1; and
a sensor device operating based on power generated by the hybrid self-generation apparatus.

14. The wireless sensor according to claim 13, further comprising a communication device operating based on the power generated by the hybrid self-generation apparatus.

15. The wireless sensor according to claim 14, wherein the hybrid self-generation apparatus generates electric power by using a vibration source and a wind power source generated during movement of a train.

16. An operation method of a hybrid self-generation apparatus, the operation method comprising:

converting, by a vibration source based generation part installed in the mechanical apparatus, vibration energy generated during operation or movement of a mechanical apparatus into first electric energy;

converting, by a wind power source based generation part installed in the mechanical apparatus, kinetic energy of air generated in periphery of a mechanical apparatus during operation or movement of the mechanical apparatus into second electric energy; and storing, by a power storage part, the first electric energy and the second electric energy, wherein the wind power source based generation part includes at least one air controller, and the wind power source based generation part automatically operates or stops power generation according to a movement speed of the mechanical apparatus according to operation of the at least one air controller, wherein the wind power source based generation part operate in a first time period during which the movement speed of the mechanical apparatus is equal to or greater than a first speed and equal to or less than a second speed, wherein the vibration source based generation part operates in a second time period during which the movement speed of the mechanical apparatus exceeds the second speed, and wherein an air inlet of the at least one air controller is opened in the first time period, and closed in the second period.

17. The operation method of claim 16, wherein the at least one air controller comprises:

a housing having an inner space, an air inlet at one side of the inner space, and an air outlet at the other side of the inner space;

a first blocking wall which is installed to divide the inner space between the one side and the other side and permits air flow between the one side and the other side;

a second blocking wall which is installed to divide the internal space between the one side and the first blocking wall and has a center hole permitting air flow between the one side and the other side;

a first air sensor plate which is disposed with a first tension spring between the first air sensor plate and the first blocking wall and blocks the center hole at the other side when a tension of the first tension spring is less than a first pressure; and a second air sensor plate which is disposed in a direction of the one side on the first air sensor plate with an interval corresponding to an interval between the first blocking wall and the first air sensor plate.

18. The operation method of claim 16, wherein the at least one air controller further includes an air reflector protruding from an inner wall between the first blocking wall and the second blocking wall of the housing to guide the air flow from the one side to the other side.

19. The operation method of claim 16, wherein the at least one air controller includes a first air controller and a second air controller which face each other with at least one rotor blade of the wind power generator interposed therebetween.

* * * * *